United States Patent [19]
Woerman et al.

[11] Patent Number: 5,750,168
[45] Date of Patent: May 12, 1998

[54] TAPIOCA STARCH CONTAINING FRENCH FRY FORMULATIONS AND METHOD OF MAKING

[75] Inventors: John Harold Woerman, Highlands Ranch; Yangsheng Wu, Englewood, both of Colo.

[73] Assignee: Penwest Foods Co., Englewood, Colo.

[21] Appl. No.: 791,182

[22] Filed: Jan. 31, 1997

Related U.S. Application Data

[63] Continuation-in-part of Ser. No. 465,939, Jun. 6, 1995, Pat. No. 5,648,110.

[51] Int. Cl.$^6$ .................................................. A23L 1/0522
[52] U.S. Cl. ............................ 426/102; 426/578; 426/637
[58] Field of Search .................................. 426/102, 578, 426/637

[56] References Cited

U.S. PATENT DOCUMENTS

| | | | |
|---|---|---|---|
| Re. 27,531 | 12/1972 | Murray et al. | 99/100 |
| 3,424,591 | 1/1969 | Gold | 426/441 |
| 3,597,227 | 8/1971 | Murray et al. | 99/100 |
| 3,751,268 | 8/1973 | Van Patten et al. | 99/100 |
| 4,272,553 | 6/1981 | Bengtsson et al. | 426/241 |
| 4,317,842 | 3/1982 | El-Hag | 426/302 |
| 4,418,090 | 11/1983 | Bohrmann et al. | 426/578 |
| 4,447,459 | 5/1984 | Balboni et al. | 426/441 |
| 4,504,509 | 3/1985 | Bell et al. | 426/548 |
| 4,529,607 | 7/1985 | Lenchin et al. | 426/94 |
| 4,542,030 | 9/1985 | Haury et al. | 426/262 |
| 4,551,340 | 11/1985 | El-Hag et al. | 426/438 |
| 4,595,597 | 6/1986 | Lenchin et al. | 426/555 |
| 4,632,848 | 12/1986 | Gosset et al. | 427/154 |
| 4,663,180 | 5/1987 | Podula | 426/637 |
| 4,931,296 | 6/1990 | Shanbhag et al. | 426/243 |
| 4,931,298 | 6/1990 | Shanbhag et al. | 426/296 |
| 4,937,084 | 6/1990 | Julian | 426/144 |
| 5,000,970 | 3/1991 | Shanbhag et al. | 426/296 |
| 5,004,616 | 4/1991 | Shanbhag | 426/102 |
| 5,059,435 | 10/1991 | Sloan et al. | 426/102 |
| 5,084,291 | 1/1992 | Burrows et al. | 426/441 |
| 5,087,467 | 2/1992 | Schwank | 426/262 |
| 5,126,152 | 6/1992 | Feeney et al. | 426/102 |
| 5,141,759 | 8/1992 | Sloan et al. | 426/102 |
| 5,188,859 | 2/1993 | Lodge et al. | 426/637 X |
| 5,217,736 | 6/1993 | Feeney et al. | 426/102 |
| 5,242,699 | 9/1993 | Bednar et al. | 426/302 |
| 5,279,840 | 1/1994 | Baisier et al. | 426/102 |
| 5,281,432 | 1/1994 | Zallie et al. | 426/549 |
| 5,302,410 | 4/1994 | Calder et al. | 426/637 |
| 5,328,704 | 7/1994 | Ritch | 426/102 |
| 5,393,552 | 2/1995 | Brusacker et al. | 426/637 |
| 5,431,944 | 7/1995 | Malvej | 426/552 |
| 5,464,642 | 11/1995 | Villagran et al. | 426/439 |
| 5,486,369 | 1/1996 | Mason | 426/321 |
| 5,622,741 | 4/1997 | Stubbs et al. | 426/243 |
| 5,648,110 | 7/1997 | Wu et al. | 426/102 |

FOREIGN PATENT DOCUMENTS

WO 85/01188  3/1985  WIPO.

OTHER PUBLICATIONS

Srivastava, M.C. et al. Viscosity Stabilisation of Tapioca Starch 73(05):L0385FSTA, 1973.

*Primary Examiner*—Helen Pratt
*Attorney, Agent, or Firm*—Marshall, O'Toole, Gerstein, Murray & Borun

[57] ABSTRACT

The present invention provides improved compositions for coating of potato strip products having an as is solids content which comprises not less than about 20% by weight ungelatinized crosslinked tapioca starch.

10 Claims, No Drawings

TAPIOCA STARCH CONTAINING FRENCH FRY FORMULATIONS AND METHOD OF MAKING

This application is a continuation-in-part of U.S. application Ser. No. 08/465,939 filed Jun. 6, 1995, now U.S. Pat. No. 5,648,110 the disclosure of which is hereby incorporated by reference.

BACKGROUND OF THE INVENTION

The present invention relates generally to coated potato products and formulations for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are each said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, Wash.) which is crosslinked with phosphorus oxychloride ($POCl_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch is said to be Flojel® 60 (National Starch and Chemical Corp., Bridgewater, N.J.) which is said to contribute crispness to the coating and to produce an optimal result when present in the coating slurry at a concentration of between two and ten percent by weight.

Of interest to the present invention is the incorporation of low levels of tapioca dextrins into starch enrobing slurries as minor components. Such tapioca dextrins are available to the industry in a variety of forms including as pure compositions (Crisp Coat™, National Starch and Chemical Co.), and as blends with high amylose starches (Crisp Coat UC™ and Crisp Coat SC®, National Starch). Nevertheless, there is no teaching in the art that ungelatinized crosslinked tapioca starch be used as a major solids component of an enrobing slurry.

Despite the many advances in the french fry coating art there nevertheless remains a need for improved enrobing slurries characterized by improved crispness, holding and flavor properties. In addition, there remains a desire in the art for enrobing slurries which reduce oil uptake by the potato products during parfrying and finish frying. Moreover, there remains a desire in the art for enrobing slurries comprising starch ingredients from sources other than potato and corn that have been the subject of the prior art.

SUMMARY OF THE INVENTION

The present invention provides improved aqueous starch enrobing slurries which provide improved flavor, crispness and other physical properties to coated potato products such as french fries. As one aspect of the present invention, starch enrobing slurries have been found that provide various improved properties to the resulting french fries which they are used to encoat. Specifically it has been found that crosslinked tapioca starches may be used to substitute for potato and corn starches as a major component of french fry enrobing slurries and further that unexpected crispness can be obtained in a french fry coating composition by utilizing a crosslinked tapioca starch characterized by a selected viscosity. The crosslinked tapioca starch may be used as the principle starch source for the enrobing slurry alone or in combination with rice flour. It has further been found that certain improved properties are provided in the absence of corn starch in compositions substantially free of corn starch. By eliminating the need for corn starch, the off-flavors associated with its use may also be eliminated.

In addition, it has also been found that improved properties may be provided to the french fry products in the absence of or using reduced levels of potato starch as well. In particular, it has surprisingly been found that the substitution of ungelatinized crosslinked tapioca starches for ungelatinized crosslinked potato starches in the enrobing slurry compositions of the invention may provide a flavor which is considered by some consumers to be equivalent to or even more potato-like to coated french fries than french fries coated with enrobing slurry compositions comprising primarily potato starches. Moreover, the use of crosslinked tapioca starches in the enrobing slurries reduces the uptake of oil into the finished potato products.

Specifically, the invention provides improved aqueous starch enrobing slurries for coating the outer surface of a potato product having an as is solids content comprising not less than 30%, and preferably not less than 50% by weight of an ungelatinized crosslinked tapioca starch characterized by a crosslinking level of from 300 ppm to 1000 ppm. More preferred are crosslinking levels of from 550 to 900 ppm with phosphorus oxychloride as the crosslinking agent with crosslinking levels of from 650 to 800 ppm being most preferred. Preferred crosslinked tapioca starches are characterized by viscosities of from 200 to 1100 Brabender Units (BU) when measured at 13.5% solids concentration after 15 minutes at 95° C. with viscosities of from 400 to 900 BU being preferred. "As is solids content" refers to the amount of solids present in typical commercially available tapioca starch which is not bone dry but typically comprises 10% to 14% water by weight. For the purposes of this invention "as is solids content" refers to a solids content for a starch assuming a water concentration of about 12% by weight.

The invention further provides frozen potato products with a film-like coating on the outer surface and processes for their preparation, which processes comprise the steps of: cutting the raw potatoes; blanching the potatoes; partially drying the potatoes; coating the potatoes with an aqueous starch slurry, the starch slurry having an as is solids content comprising not less than 20% by weight (and preferably not less than 30% by weight) of an ungelatinized crosslinked tapioca starch characterized by a viscosity of from 200 to 1100 BU when measured at 13.5% solids concentration after 15 minutes at 95° C.; parfrying the potatoes in hot oil; and freezing the potatoes.

The invention further provides a process for preparing an aqueous starch enrobing slurry for coating the outer surface of a potato product, which comprises forming an aqueous slurry having an as is solids content comprising not less than 20% and preferably not less than 30% by weight of an ungelatinized crosslinked tapioca starch characterized by a viscosity of from 200 to 1100 BU when measured at 13.5% solids concentration after 15 minutes at 95° C. All ingredients stated herein are based on dry ingredients as 100%, with 100% to 400%, preferably 120% to 300% water added based upon dry ingredients to make the batter slurry.

DETAILED DESCRIPTION

Processes for the production of frozen french fries are well known and include the basic steps of preparing raw potatoes by washing, peeling and cutting into appropriately shaped pieces. The resulting potato strips are then blanched according to conventional methods in order to inactivate enzymes in the potato and to leach sugars from the surface of the potato strip. According to one preferred method, the blanched potato strips are treated in a brine solution comprising components such as sodium chloride, dextrose and other ingredients known to the art. After these steps, the potato strips are then subjected to a drying step to reduce the moisture present in the strips.

The strips are then coated with the aqueous starch enrobing slurry of the invention having an as is solids content comprising not less than about 30% by weight and preferably not less than about 50% by weight of ungelatinized crosslinked tapioca starch characterized by a viscosity of from 200 to 1100 BU when measured at 13.5% solids concentration after 15 minutes at 95° C. After blending of the solid ingredients with a desired amount of water to produce the french fry batter, the batter may be applied to coat the cut potato strips at a batter pickup of from about 8% to about 30% with a pickup of from 13% to about 18% being preferred and a coating pickup of about 15% being particularly preferred. (based on coated potato strips weight).

After coating with the coating composition, the potato strips are drained and parfried at a temperature of from about 360° F. to about 390° F. for a time period of from 40 seconds to about 90 seconds. Parfrying serves to gelatinize the starch of the potato strips and of the coating and removes moisture from the inside of the potato strip.

The potato strips are then frozen, packaged and preferably stored at a temperature below 0° F. until they are prepared for final consumption. In order to prepare the potato strips for consumption, they are cooked either by finish frying or by baking in an oven. After such preparation, potato strips prepared according to the invention are characterized by a crisp outer layer, a moist tender interior and improved flavor qualities compared to those prepared with coating compositions comprising corn starch components.

Ungelatinized crosslinked tapioca starch is the major component of the coating batters of the invention because of its unique properties. Tapioca starch has good film-forming properties, good clarity after cooking, and unexpected and improved flavor properties. These properties contribute to the formation of a crispy coating on french fries which they are used to coat. In addition, tapioca starch is characterized by a bland flavor. Nevertheless, one surprising aspect of the invention relates to the fact that the incorporation of the crosslinked tapioca starch enhances the potato flavor of coated french fries for many consumers.

Minor amounts of pregelled potato starches may be used in the compositions of the invention to provide viscosity control and suspension of the solids in the batter. Specifically, the aqueous slurry may have an as is solids content of up to about 5% by weight of an unmodified pregelled potato starch for viscosity control. One preferred pregelled potato starch for such use is available commercially as PenPlus® 40 (Penwest Foods Co., Englewood, Colo.) which can be incorporated into the batter composition at preferred solids concentrations of 1% to 5% by weight.

Nevertheless, the major solids component of the aqueous enrobing slurries of the invention is an ungelatinized crosslinked tapioca starch characterized by a viscosity of from 200 to 1100 BU when measured at a 13.5% solids concentration after 15 minutes at 95° C. Such tapioca starches typically have a crosslinking level of from 550 to 900 ppm using $POCl_3$ as the crosslinking agent with 675 ppm being preferred. Unmodified starches are generally not suitable for use with the invention because they tend to gelatinize at lower temperatures than do the crosslinked starches and cause coated french fries to stick together during the early stage of frying. Modifying the starch by crosslinking solves this problem and helps control the viscosity of the starch. Nevertheless, it has been found that not all batters made from ungelatinized crosslinked tapioca starches produce satisfactory results. Specifically, it has been found that the viscosity of the crosslinked tapioca starch is critical to the overall qualities of the coated french fries and to the ability to minimize the use of corn starch in the enrobing slurry. Accordingly, ungelatinized crosslinked tapioca starches for use with the invention preferably are characterized by a viscosity of from 200 to 1100, and preferably 400 to 900 Brabender Amylograph units (BU) when measured at 13.5% solids concentration for 15 minutes at 95° C. according to the methodology set out below. It is believed that starches with low levels of crosslinking resulting in viscosities greater than about 1100 BU may tend to produce french fries characterized as tough and chewy in the absence of a corn starch component. It is believed that roughness is diminished and tenderness improved with increasing levels of crosslinking. Moreover, the french fries coated with tapioca starch compositions characterized by crosslinking levels of less than 300 ppm tend to clump and stick together during the early stages of frying and produce undesirable french fries. In addition, it has been found that in the absence of a corn starch component, highly crosslinked tapioca starches characterized by viscosities less than about 200 BU tend to produce french fries which lose their crispnes more rapidly than other coated fries. Such fries can be very crispy immediately after frying, but have short holding times.

While the viscosities of ungelatinized crosslinked tapioca starches are generally controlled by the degree to which the starch is crosslinked it is believed that other factors, such as heat annealing may reduce viscosity and increase gelatinization temperatures and can affect the actual viscosity when used according to the invention and measured according to procedure set out below. Nevertheless, it has been found that tapioca starches which have a crosslinking level of from 550 ppm to 900 ppm based upon the dry weight of starch of phosphorus oxychloride added during the crosslinking reaction result in starches having appropriate viscosities (ranging from about 200 to about 1100 BU according to the specified test method) for practice in the formulations of the invention. More preferably, the tapioca starches have a crosslinking level between 650 ppm and 800 ppm phosphorus oxychloride based upon the dry weight of starch tend to result in starches having preferred viscosities ranging from about 400 BU to about 900 BU.

The modified tapioca starches used in practice of the invention are crosslinked with any of a variety of agents according to methods well known to the art but are preferably crosslinked with phosphorus oxychloride under alkaline conditions. Sodium trimetaphosphate is useful for crosslinking but reacts more slowly than does phosphorus oxychloride and accordingly substantially more reagent is required to achieve the same level of crosslinking as would be achieved with phosphorus oxychloride. Adipic anhydride is also useful as a crosslinking agent but reacts even more slowly than does sodium trimetaphosphate. Less preferably, epichlorhydrin may also be used at equivalent levels of crosslinking. A particularly preferred starch for use with the invention is an ungelatinized tapioca starch crosslinked with phosphorus oxychloride at a concentration of 675 ppm ($POCl_3$) (XC-150, Penwest Foods Co., Englewood Colo.). According to one aspect of the invention, proportions of the crosslinked tapioca starches of the invention may be substituted by crosslinked potato starches having similar properties.

Different tapioca starches having different levels of crosslinking, and thus exhibiting different viscosities, may be used together in practice of the invention. For example, one modified tapioca starch having a crosslinking level of 300 ppm and characterized by a relatively high viscosity may be used in conjunction with another modified tapioca starch having a crosslinking level of 1000 ppm and characterized by a relatively low viscosity to yield a blend of modified starches characterized by a crosslinking level and having a viscosity intermediate between those of the two components. It is noted that United States Food and Drug Administration regulations prohibit the use in food products of starches having greater than 1000 ppm $POCl_3$ crosslinking (based on dry weight of starch solids.) Thus, other tapioca starches which are crosslinked at a concentrations too high or too low and thus are characterized by viscosities inappropriate for use alone in practice of the invention can be used in conjunction with other tapioca starches provided that the overall tapioca starch component is characterized by a viscosity within the desired range. Nevertheless, it is generally preferred that the majority (i.e., greater than 50% by weight) of the tapioca starch component comprise a single unblended modified tapioca starch characterized by a viscosity of from about 200 to about 1100 BU according to the specified method being particularly preferred.

The method for determining the viscosity of ungelatinized crosslinked tapioca starches for use according to the invention utilizes a Brabender Amylograph viscometer according to conventional methods known to the art as set out below. Specifically, 45.0 grams of "dry basis" tapioca starch (to yield 13.5% solids) is placed in a beaker to which distilled water is added to make up 450 grams and is mixed thoroughly with a magnetic stirring bar. The pH of the mixture is adjusted to 7.0 with dilute (approximately 0.5%) NaOH or dilute (approx. 0.5%) HCl. The pH should be determined over a period of 5 to 10 minutes and should be measured both before and after the viscometer run. The starch slurry is then added to the viscometer bowl and the beaker rinsed with distilled water to give a total starch and water weight of 500 grams. The Brabender Amylograph is then run on program 2 comprising a starting temperature of 25° C., a heating rate of 1.5° C./minute to 95° C., running at 95° C. for 15 minutes wherein the measurement is taken at the conclusion of 15 minutes in Brabender units (BU), and cooling at 1.5° C./minute to 50° C.

The tapioca starches of the invention may also be further modified by acetylation or hydroxypropylation but such modification is not necessary for practice of the invention. According to one aspect of the invention, a 7% acetylation addition level to starch resulting in starch with retention of 2.1% acetylation by weight has been found to produce a desirable tapioca starch. One preferred acetylated starch is an ungelatinized acetylated tapioca starch crosslinked with phosphorus oxychloride at a concentration of 675 ppm ($POCl_3$). If the tapioca starches are so modified, it is generally necessary to increase the level of crosslinking in order to obtain an equivalent level of viscosity.

The starch enrobing slurries of the invention can optionally comprise a rice flour component at a solids concentration of from about 10% to about 25% by weight with concentrations of from about 15% to about 20% by weight (as is solids basis) being preferred. Greater concentrations of rice flour may tend to make the final coated french fry products too tough while lower concentrations may provide products with too little crispness. Rice flours suitable for use with the invention include long grain, medium grain or waxy rice with long grain rice flour being preferred. Long grain rice provides the best results for crispness, because of its higher amylose content in the starch. Use of medium grain rice flour tends to give a tough bite to the batter coating and waxy rice flour provides a hard crunch immediately after frying but the batter coating becomes soft and chewy within ten minutes after frying.

A variety of other flours and starches may optionally be used in producing the coating formulations of the invention including but not limited to potato starch, potato flour, wheat flour, wheat starch, oat flour, oat starch, corn flour and corn starch. Such starches may be crosslinked and/or substituted such as by acetylation or other means.

Optional minor ingredients for use in providing the coating compositions of the invention include maltodextrins, dextrins, microcrystalline cellulose, and hydrocolloids including hydroxypropyl methyl cellulose, and gums including xanthan gum, guar gum and the like which are used to provide improved structure and keeping qualities to the coated french fry products. Maltodextrins are preferably used at solids concentrations of up to 6%. Maltodextrins useful with the invention may be derived from any type of starch including tapioca, potato and corn starch and include those characterized by having a DE in the range from 2 to 7 with maltodextrins having a DE of about 5 being preferred.

Dextrins obtained from a variety of sources may also be used according to the invention. Suitable tapioca dextrins that may be used according to the invention include those commercially available as Crisp Coat®, Crisp Coat UC® and Crisp Coat SC® (National Starch and Chemical Co.) which comprise tapioca dextrin alone or in combination with high amylose corn starch. Preferred gum blends comprise approximately 10% gum by weight and are preferably incorporated into the compositions of the invention at solids concentrations of less than 0.1% gum by weight.

Leavening agents in the form of baking powders may also be incorporated into the compositions of the invention in order to open up the structure of the coating batters upon cooking and release moisture from the french fry products without blowing off the coating layer. Suitable baking powders include sodium bicarbonate plus one or more leavening acids such as those in the group consisting of sodium aluminum phosphate (SALP), sodium aluminum sulfate (SAS), sodium acid pyrophosphate (SAPP), dicalcium phosphate (DCP), and anhydrous monocalcium phosphate (AMCP). The combination of sodium bicarbonate and SAPP is preferred. Such leavening agents are preferably added at sodium bicarbonate concentrations of about 0.9 parts soda to 1.1 parts SAPP.

Additional ingredients include protein components such as sodium caseinate, nonfat dry milk, soy, whey, dried egg whites. Such proteins interact with the carbohydrates in the coating compositions to increase film strength, provide structure, improve crispness and prolong holding of crispness. Other ingredients include carbohydrate components such as methyl cellulose, hydroxypropyl methyl cellulose, microcrystaline cellulose and the like. Still other optional ingredients may also be incorporated into the coating formulations of the invention including salt, flavorings, seasonings and coloring agents such as whey or dextrose.

Preferred starch enrobing slurries for use according the invention comprise on a dry solids weight basis from 50% to 70% of a modified ungelatinized tapioca starch having a viscosity of 400 to 900 BU according to the specified method and crosslinking level of from 650 to 750 ppm based on $POCl_3$; 10% to 20% long grain rice flour; 0% to 10% of maltodextrin characterized by a DE of from 2 to 7; 0% to 0.6% sodium caseinate; 0 to 2% nonfat dry milk; 0% to 4% sweet whey; 0% to 1% dextrose (Cantab®); and 0% to 10% salt to yield 100 parts solids. These solids are preferably blended with 150 to 200 parts of water to form the enrobing batter. The enrobing batter is then preferably applied to potato strips at a batter pickup of 13% to 18% by weight. A particularly preferred enrobing batter comprises 55.2% by weight of tapioca starch crosslinked at 675 ppm; 3% by weight potato starch crosslinked at 900 ppm (Penwest Foods, 4-9000); 1.1% by weight pregelled crosslinked (213 ppm) potato starch (Penwest Foods, PenPlus-40); 0.3% of a hydrocolloid viscosifier (Methocel® K4M); 5% by weight salt; 0.8% by weight SAPP #28; 0.6% by weight soda; 18% by weight rice fluor; and 16% by weight of a blend of high amylose corn starch and tapioca dextrin (National Starch and Chemical Co., Crisp Coat UC®).

The french fry coating composition is prepared by dry blending of the various solid ingredients. The dry ingredients are then slowly added to an amount of water selected to provide an appropriate viscosity to the coating batter. It has been found that aqueous slurries containing from about 150 parts to about 300 parts by weight water to 100 parts by weight of the solid ingredients are characterized by a preferred viscosity for coating of the potato strips. Because the starches remain ungelatinized during the coating process they do not substantially contribute to the viscosity of the solution.

The crispness of the batter coated french fries is determined by several factors including the cook-out of the starch, the moisture balance between the batter coating surface and inside of the fries, the thickness of the coating layer, and the interaction of ingredients in the coating formulation. The coating forms a discontinuous film which lets the moisture from the inside of the fries escape or vent out, but will not absorb significant amounts of moisture into the coating layer. Controlling moisture migration is important to maintaining the crispness of the fries under a heat lamp. The coating should preferably be somewhat brittle, which gives a clean bite with minimum toughness. There is a fine balance between all the ingredients in the batter formula to achieve crispness and keeping quality with the method used to process the potato strips contributing to the crispness of the french fries. It is further contemplated that the improved properties provided by the solids making up the starch enrobbing slurries of the invention may also be provided when the solids ingredients making up the slurries are applied to potato products in a non-slurry form such as by dusting.

Other aspects and advantages of the present invention will be understood upon consideration of the following illustrative and comparative examples.

EXAMPLE 1

According to this example, potato strips were prepared according to conventional methods and coated with various starch slurries comprising modified tapioca starches characterized by different levels of $POCl_3$ crosslinking and resulting viscosities were prepared using the ingredients listed in Table 1 below. The table presents the extent of crosslinking for the resulting tapioca starch. The pregelled tapioca starches have significantly higher viscosities than do the ungelatinized tapioca starches.

Specifically, Russet-Burbank potatoes were peeled, cut into 9/32 inch strips and immersed and blanched in hot water for 4 to 8 minutes at 170°–180° F. After blanching, the potato strips were immersed for 30 seconds in an aqueous solution comprising 0.5% SAPP plus 2.5% salt which was held at a temperature of 160°–170° F. After removal, the strips were drained and then dried in a conventional dryer at 180° F., for a sufficient length of time to effectuate a 12 to 14 percent water loss.

Starch slurries were then prepared comprising the ingredients listed in Table 1 including water at about 50° F. The water and dry ingredients were placed in a mixing bowl and mixed with a paddle for three minutes at low speed and one minute at medium speed with the batter temperature maintained at below 65° F. The potato strips were then dipped in the starch slurries and held at 65° F. The potato strips were then drained for 60 seconds to remove excess slurry and to achieve a slurry coating pickup of 15%. The strips were then parfried in soy oil for 40 seconds at 370° F. The potato strips were then frozen in a blast freezer for 30 minutes, transferred into plastic bags and kept in the same freezer overnight at approximately 0° F. The frozen samples were reconstituted by frying at 360° F. for 2.5 minutes. The resulting french fries were then placed under heat lamps, and evaluated for color, bite, crispness, taste and holding time.

The resulting products were then tested to evaluate their properties including the degree of crispness at 15 minutes after being removed from the finish fryer (1 being the poorest and 6 being the best), and the uptake of oil in percent by weight with the results presented in Table 1.

According to the results illustrated in Table 1 the enrobing slurry comprising tapioca starch crosslinked at a 600 ppm phosphorus oxychloride (POCl₃) concentration had the less oil uptake than the unmodified tapioca starch while maintaining excellent crispness at 15 minutes. The hydrolyzed tapioca starch had slightly better crispness at 15 minutes than did the unmodified tapioca starch but had substantially greater oil pickup than did the unmodified tapioca starch.

TABLE 1

| Example | 1A | 1B | 1C |
|---|---|---|---|
| Ingredient | | | |
| Unmodified Tapioca Starch | 54.69 | | |
| Hydrolyzed Tapioca Starch DE = 0.19 | | 54.69 | |
| Crosslinked Tapioca Starch (600 ppm) | | | 54.69 |
| Crosslinked Potato Starch (900 ppm) (Penwest Foods 4-9000) | 10.808 | 10.808 | 10.808 |
| Rice Flour | 20.07 | 20.07 | 20.07 |
| Pregelled Crosslinked Potato Starch (213 ppm) (PenPlus-40) | 2.14 | 2.14 | 2.14 |
| Guar Gum | 0.022 | 0.022 | 0.022 |
| Corn Maltodextrin (DE 4) | 5.35 | 5.35 | 5.35 |

TABLE 1-continued

| Example | 1A | 1B | 1C |
|---|---|---|---|
| (Maltrin 040) | | | |
| Salt | 4.79 | 4.79 | 4.79 |
| SAPP #28 | 1.17 | 1.17 | 1.17 |
| Soda | 0.96 | 0.96 | 0.96 |
| Total % | 100 | 100 | 100 |
| Crispness at 15 minutes | 5.5 | 6 | 5 |
| % Oil Uptake | 7.7 | 11 | 5.7 |

EXAMPLE 2

According to this example, tapioca starches characterized by different levels of crosslinking and tapioca starch hydrolyzate products were compared according to the methods of Example 1 with the results presented in Table 2.

TABLE 2

| Ingredients | 2-A | 2-B | 2-C | 2-D | 2-E | 2-F | 2-G |
|---|---|---|---|---|---|---|---|
| Crosslinked tapioca starch (300 ppm) | 59.1 | | | | | | |
| Crosslinked tapioca starch (600 ppm) | | 59.1 | | | | | |
| Crosslinked tapioca starch (900 ppm) | | | 59.1 | | | | |
| Hydrolyzed wheat starch DE = <1.0 | | | | | 25.78 | 10.31 | |
| Hydrolyzed tapioca starch DE = 0.40 | | | | 51.56 | 25.78 | 41.25 | 25.78 |
| Crosslinked potato starch (800 ppm) | | | | | | | 25.78 |
| Crosslinked potato starch (900 ppm) | 17 | 17 | 17 | 10 | 10 | 10 | 10 |
| Pregelled unmodified potato starch | 3 | 3 | 3 | | | | |
| Rice Flour | 15 | 15 | 15 | 18.75 | 18.75 | 18.75 | 18.75 |
| 4DE Corn Maltodextrin (Maltrin 040) | | | | 5 | 5 | 5 | 5 |
| Pregelled crosslinked potato starch (213 ppm) (PenPlus-40) | | | | 2.92 | 2.92 | 2.92 | 2.92 |
| Blend of 10% Guar Gum/90% Crosslinked Potato Starch (900 ppm) | 0.2 | 0.2 | 0.2 | 0.2 | 0.2 | 0.2 | 0.2 |
| Baking Powder Blend comprising 10% SAPP, 10% soda, and 80% modified tapioca starch | 0.5 | 0.5 | 0.5 | | | | |
| SAPP #28 | | | | 1.1 | 1.1 | 1.1 | 1.1 |
| Baking Soda | | | | 0.9 | 0.9 | 0.9 | 0.9 |
| Na Caseinate | 0.2 | 0.2 | 0.2 | | | | |
| Dextrose (CanTab ®) | 1 | 1 | 1 | | | | |
| Salt | 4 | 4 | 4 | 9.58 | 9.58 | 9.58 | 9.58 |
| Total % | 100 | 100 | 100 | 100 | 100 | 100 | 100 |
| Crispness at 15 min. | 4.5 | 4 | 5 | 5.5 | 6 | 6 | 6 |

EXAMPLE 3

According to this example, various formulations comprising crosslinked tapioca starch and crosslinked acetylated tapioca starch were prepared and tested according to the methods of Example 1 with the results presented in Table 3.

TABLE 3

| Ingredients | 3-A | 3-B | 3-C | 3-D | 3-E | 3-F | 3-G |
|---|---|---|---|---|---|---|---|
| Crosslinked Tapioca Starch (675 ppm) | 55.35 | | 71.35 | | 55.35 | | |
| Crosslinked (675 ppm) and 2.1% Acetylated Tapioca Starch | | 55.35 | | 71.35 | | 55.35 | |
| Crosslinked Tapioca Starch (300 ppm) | | | | | | | 55.35 |
| Xanthan Gum | 0.2 | 0.2 | 0.2 | 0.2 | 0.2 | 0.2 | 0.2 |
| Salt | 8 | 8 | 8 | 8 | 8 | 8 | 8 |
| SAPP #28 | 0.8 | 0.8 | 0.8 | 0.8 | 0.8 | 0.8 | 0.8 |
| Soda | 0.65 | 0.65 | 0.65 | 0.65 | 0.65 | 0.65 | 0.65 |
| Rice Flour | 19 | 19 | 19 | 19 | 19 | 19 | 19 |
| Blend of High Amylose Corn Starch and Tapioca Dextrin (Crisp Coat UC ®) | | | | | 16 | 16 | 16 |
| High Amylose Dent Corn Starch (Hylon V ®) | 11 | 11 | | | | | |
| Hydrolyzed Corn Starch DE = <1 (Stadex 60K ®) | 5 | 5 | | | | | |
| Total % | 100 | 100 | 100 | 100 | 100 | 100 | 100 |
| Crispness at 15 minutes (x/x = multiple results) (t = tough) | 5 | 5 | 5 | 5t | 6/6 | 6t/5.5 | 6/5.5 |

EXAMPLE 4

This example utilizes formulations similar to those of Example 3 except that a modified high amylose corn starch (Crisp Film®, National Starch and Chemical) is substituted for the unmodified high amylose corn (Hylon V) and blend of high amylose corn starch and tapioca dextrin (Crisp Coat UC®) ingredients. The results of this substitution are reported in Table 4 and appear to provide slightly improved properties to the resulting french fries.

TABLE 4

| Example | 4A | 4B | 4C | 4D | 4E |
|---|---|---|---|---|---|
| Crosslinked Tapioca Starch (675 ppm) | 55.35 | | | 55.35 | |
| Crosslinked (675 ppm) and 2.1% Acetylated Tapioca Starch | | 55.35 | | | 55.35 |
| Crosslinked Tapioca Starch (300 ppm) | | | 55.35 | | |
| Xanthan Gum | 0.2 | 0.2 | 0.2 | 0.2 | 0.2 |
| Salt | 8 | 8 | 8 | 8 | 8 |
| SAPP #28 | 0.8 | 0.8 | 0.8 | 0.8 | 0.8 |
| Soda | 0.65 | 0.65 | 0.65 | 0.65 | 0.65 |
| Rice Flour | 19 | 19 | 19 | 19 | 19 |
| High Amylose Acetylated Corn Starch (Crisp Film ®) | 11 | 11 | 11 | 11 | 11 |
| Hydrolyzed Corn Starch DE = <1 (Stadex 60K ®) | 5 | 5 | 5 | | |
| Potato Dextrin | | | | 5 | 5 |
| Total % | 100 | 100 | 100 | 100 | 100 |
| Crispness at 15 minutes (t = tough) | 6 | 6 | 5.5 | 5.5t | 5t |

EXAMPLE 5

According to this example, the effects of variations in the concentration of a preferred 675 ppm crosslinked tapioca starch and additional starch ingredients are determined according to the general methods of Example 1. The results are presented in Tables 5A and 5B.

TABLE 5A

| EXAMPLE | 5A | 5B | 5C | 5D | 5E | 5F |
|---|---|---|---|---|---|---|
| Crosslinked Tapioca Starch (675 ppm) | 54.1 | 52.1 | 52.1 | 50.1 | 56.1 | 55.1 |
| Pregelled Crosslinked (213 ppm) Potato Starch (PenPlus-40 ®) | 1.2 | 1.2 | 1.2 | 1.2 | 1.2 | 1.1 |
| Methocel K4M | 0.3 | 0.3 | 0.3 | 0.3 | 0.3 | 0.3 |
| Salt | 8 | 8 | 8 | 8 | 8 | 8 |
| SAPP #28 | 0.8 | 0.8 | 0.8 | 0.8 | 0.8 | 0.8 |
| Soda | 0.6 | 0.6 | 0.6 | 0.6 | 0.6 | 0.6 |
| Rice Flour | 19 | 19 | 17 | 19 | 18 | 18 |
| High Amylose Corn/Tapioca Dextrin Blend (Crisp Coat UC ®) | | | | | | |
| High Amylose Acetylated Corn (Crisp Film ®) | 11 | 13 | 15 | 15 | 10 | 11 |
| Tapioca Dextrin (National Starch 0280) | | | | | | 5 |
| Potato Dextrin | | | | | | |
| Hydrolyzed Potato Starch DE = 0.5 | | | | | | |

TABLE 5A-continued

| EXAMPLE | 5A | 5B | 5C | 5D | 5E | 5F |
|---|---|---|---|---|---|---|
| Hydrolyzed Corn Starch DE = <1 (Stadex 60K ®) | 5 | 5 | 5 | 5 | 5 | |
| Total % | 100 | 100 | 100 | 100 | 100 | 100 |
| Crispness at 15 minutes | 5.5 | 5.5 | 5.5 | 5.5 | 6 | 6 |

TABLE 5B

| EXAMPLE | 5G | 5H | 5I | 5J | 5K | 5L | 5M |
|---|---|---|---|---|---|---|---|
| Crosslinked Tapioca Starch (675 ppm) | 55.1 | 55.1 | 59.1 | 55.1 | 55.1 | 55.1 | 55.1 |
| Pregelled Crosslinked Potato Starch 213 ppm (PenPlus-40 ®) | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 |
| Salt | 8 | 8 | 8 | 8 | 8 | 8 | 8 |
| SAPP #28 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 |
| Rice Flour | 18 | 18 | 18 | 18 | 18 | 18 | 18 |
| High Amylose Corn/Tapioca Dextrin Blend (Crisp Coat UC ®) | | 16 | 12 | | | | |
| High Amylose Acetylated Corn (Crisp Film ®) | 10 | | | 11 | 10 | 10 | 11 |
| Tapioca Dextrin (National Starch 0280) | 6 | | | | | | |
| Potato Dextrin | | | | 5 | 6 | | |
| Hydrolyzed Potato Starch DE = 0.5 | | | | | | 6 | 5 |
| Hydrolyzed Corn Starch DE = <1 (Stadex 60K ®) | | | | | | | |
| Total % | 100 | 100 | 100 | 100 | 100 | 100 | 100 |
| Crispness at 15 minutes (t = tough) | 6 | 5.5 | 6 | 6 | 5.5 | 5t | 5.5t |

EXAMPLE 6

According to this example, the effects of variations in the concentration of a preferred 675 ppm crosslinked tapioca starch and additional starch ingredients are determined according to the general methods of Example 1. The results are reported in Tables 6A and 6B.

TABLE 6A

| EXAMPLE | 6A | 6B | 6C | 6D | 6E | 6F |
|---|---|---|---|---|---|---|
| Crosslinked Tapioca Starch (675 ppm) | 59.2 | 54.2 | 55.2 | 45.2 | 56.95 | 52.2 |
| Crosslinked Potato Starch (900 ppm) (Penwest Foods 4–9000) | | 5 | | 10 | 3 | 3 |
| Pregelled Crosslinked Potato Starch 213 ppm (PenPlus-40 ®) | 1.1 | 1.1 | 1.1 | 1.1 | 1.1 | 1.1 |
| Methocel K4M | 0.3 | 0.3 | 0.3 | 0.3 | 0.3 | 0.3 |
| Salt | 8 | 8 | 8 | 8 | 3.25 | 8 |
| SAPP #28 | 0.8 | 0.8 | 0.8 | 0.8 | 0.8 | 0.8 |
| Soda | 0.6 | 0.6 | 0.6 | 0.6 | 0.6 | 0.6 |
| Rice Flour | 18 | 18 | 18 | 18 | 18 | 18 |
| Blend of High Amylose Corn Starch and Tapioca Dextrin (Crisp Coat UC ®) | 12 | 12 | 16 | 16 | 16 | 16 |
| Total | 100 | 100 | 100 | 100 | 100 | 100 |
| Crispness at 15 minutes | 5.5 | 6 | 6 | 5.5 | 5 | 6 |

TABLE 6B

| EXAMPLES | 6G | 6H | 6I | 6J | 6K |
|---|---|---|---|---|---|
| Crosslinked Tapioca Starch (675 ppm) | 59.2 | 48.2 | 52 | 51.9 | 51.8 |
| Crosslinked Potato Starch (900 ppm) (Penwest Foods 4–9000) | | 3 | 3 | 3 | 3 |
| Pregelled Crosslinked Potato Starch 213 ppm (PenPlus-40 ®) | 1.1 | 1.1 | 1.1 | 1.1 | 1.1 |
| Methocel K4M | 0.3 | 0.3 | 0.5 | 0.6 | 0.7 |
| Salt | 8 | 8 | 8 | 8 | 8 |
| SAPP #28 | 0.8 | 0.8 | 0.8 | 0.8 | 0.8 |
| Soda | 0.6 | 0.6 | 0.6 | 0.6 | 0.6 |
| Rice Flour | 18 | 22 | 18 | 18 | 18 |
| Blend of High Amylose | 12 | 16 | 16 | 16 | 16 |

TABLE 6B-continued

| EXAMPLES | 6G | 6H | 6I | 6J | 6K |
|---|---|---|---|---|---|
| Corn Starch and Tapioca Dextrin (Crisp Coat UC ®) | | | | | |
| Total | 100 | 100 | 100 | 100 | 100 |
| Crispness at 15 minutes | 5.5 | 5.5 | 5.5 | 5.5 | 5.5t |

EXAMPLE 7

According to this example, the effects of variations in the identity of hydrolyzed corn starches was determined on a preferred composition comprising a preferred 675 ppm crosslinked tapioca starch according to the general methods of Example 1. The results are reported in Table 7 below.

TABLE 7

| EXAMPLES | 7A | 7B | 7C | 7D | 7E |
|---|---|---|---|---|---|
| Crosslinked Tapioca Starch (675 ppm) | 52.2 | 52.2 | 52.2 | 52.2 | 52.2 |
| Crosslinked Potato Starch (900 ppm) (Penwest Foods 4–9000) | 3 | 3 | 3 | 3 | 3 |
| Pregelled Crosslinked Potato Starch 213 ppm (PenPlus-40 ®) | 1.1 | 1.1 | 1.1 | 1.1 | 1.1 |
| Methocel K4M | 0.3 | 0.3 | 0.3 | 0.3 | 0.3 |
| Salt | 8 | 8 | 8 | 8 | 8 |
| SAPP #28 | 0.8 | 0.8 | 0.8 | 0.8 | 0.8 |
| Soda | 0.6 | 0.6 | 0.6 | 0.6 | 0.6 |
| Rice Flour | 18 | 18 | 18 | 18 | 18 |
| High Amylose Corn Starch and Tapioca Dextrin Blend (Crisp Coat UC ®) | 11 | 11 | 11 | 11 | 11 |
| Hydrolyzed Corn Starch DE = <1 (Stadex 60 ®) | 5 | | | | |
| Hydrolyzed Corn Starch DE = >1 (Stadex 90) | | 5 | | | |
| Hydrolyzed Potato Starch DE = 4.7 (Avebe) | | | 5 | | |
| Hydrolyzed Tapioca Starch DE = <1 (AEStaley Dex. #11) | | | | 5 | |
| Hydrolyzed Tapioca Starch (Nat. St. TapDex 0280) | | | | | 5 |
| Total | 100 | 100 | 100 | 100 | 100 |
| Crispness at 15 minutes | 5 | 5.5 | 5.5 | 5.5 | 5.5 |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A process for preparing a frozen potato product with a film-like coating on the outer surface, which comprises:

cutting the raw potatoes;

blanching the potatoes;

partially drying the potatoes;

coating the potatoes with an aqueous starch slurry, the starch slurry having an as is solids content comprising not less than 30% by weight ungelatinized crosslinked tapioca starch characterized by a crosslinking level of from 300 to 1000 ppm;

parfrying the potatoes in hot oil; and freezing the potatoes.

2. The process of claim 1 wherein the starch slurry is characterized by having an as is solids content comprising not less than 50% by weight ungelatinized crosslinked tapioca starch.

3. The process of claim 1 wherein the ungelatinized crosslinked tapioca starch has a crosslinking level of from 550 to 900 ppm.

4. The process of claim 1 wherein the tapioca starch has a crosslinking level of from 650 to 800 ppm.

5. The process of claim 1 wherein the ungelatinized crosslinked tapioca starch is characterized by a viscosity of from 400 to 900 BU when measured at 13.5% solids concentration for 15 minutes at 95° C.

6. The process of claim 1 wherein the starch is crosslinked with an agent selected from the group consisting of phosphorus oxychloride, sodium trimetaphosphate, adipic anhydride and epichlorohydrin.

7. The process of claim 1 wherein the aqueous slurry is substantially free of corn starch.

8. A coated potato product produced according to the method of claim 1.

9. A fried potato product having a coating comprising an as is solids content of at least 30% by weight of a crosslinked tapioca starch characterized by a crosslinking level of from 300 to 1000 ppm.

10. A process for preparing an aqueous starch enrobing slurry for coating the outer surface of a potato product which comprises:

forming an aqueous slurry having an as is solids content comprising not less than about 30% by weight ungelatinized crosslinked tapioca starch characterized by a crosslinking level of from 300 to 1000 ppm.

* * * * *